Jan. 8, 1957  L. J. BIRO  2,776,569
CLINICAL THERMOGRAPHS
Filed Sept. 9, 1952  3 Sheets-Sheet 2

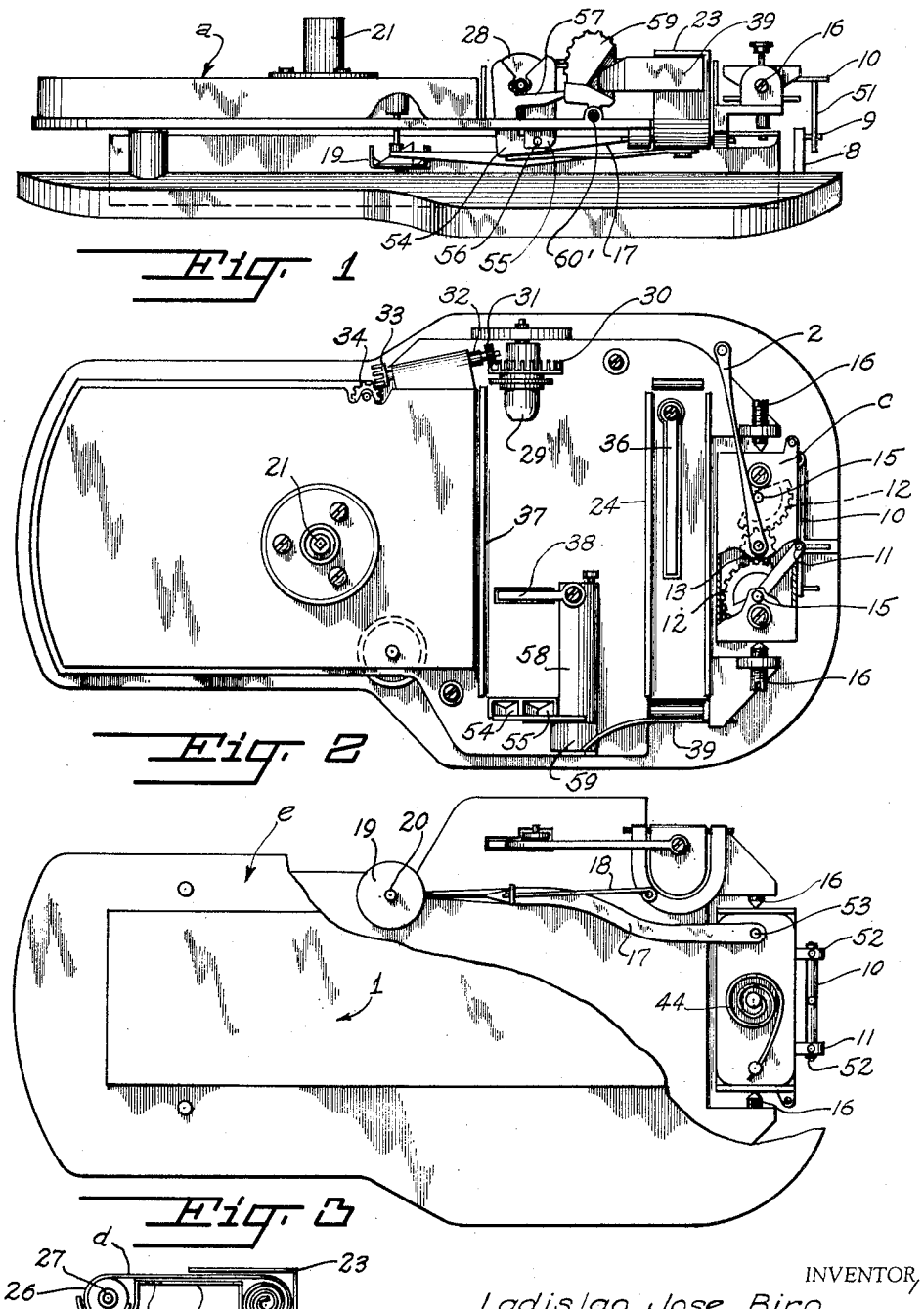

INVENTOR
Ladislao Jose Biro
BY
ATTORNEY

Jan. 8, 1957     L. J. BIRO     2,776,569
CLINICAL THERMOGRAPHS

Filed Sept. 9, 1952     3 Sheets-Sheet 3

INVENTOR,
Ladislao Jose Biro

BY

ATTORNEY

United States Patent Office 2,776,569
Patented Jan. 8, 1957

2,776,569
CLINICAL THERMOGRAPHS

Ladislao José Biro, Buenos Aires, Argentina

Application September 9, 1952, Serial No. 308,655

5 Claims. (Cl. 73—343)

This invention relates to a clinical thermograph, and more particularly to a clinical thermograph that is adapted to be applied directly to a portion of a patient's body.

The object of the invention is to provide a clinical thermograph for attachment to a portion of the patient's body, whereby the temperature of the patient's body can be accurately indicated and recorded.

Another object of the invention is to provide a clinical thermograph that includes straps for attaching the instrument to the patient's body, there being a heat-responsive member carried by the instrument and adapted to be arranged contiguous to a portion of the patient's body, whereby the temperature of the patient's body will cause actuation of a temperature-indicating and recording mechanism.

Still another object of the invention is to provide a clinical thermograph which includes a means for insuring that the indicating needle moves smoothly and not abruptly, there being a clock mechanism for continuously causing movement of the chart or thermogram, so that the temperature of the patient's body will be recorded on the chart over pre-determined periods of time, the indicating needle carrying a piercing point on its free end for piercing the paper or chart in order to produce a record of the temperature of the patient's body.

A still further object of the invention is to provide a clinical thermograph which includes means for attaching the instrument to a portion of the patient's body, the instrument of the present invention involving a clockwork mechanism, a thermal plate that is adapted to be arranged contiguous to the patient's body, a marking device operatively connected to a thermo-sensitive element, and a temperature recording means that is provided with a clinical temperature chart that circulates or moves due to the action of the clockwork mechanism, whereby a needle will indicate and record temperature fluctuations on the chart.

A still further object of the invention is to provide a clinical thermograph which will indicate the temperature of a person's body with the utmost accuracy, and wherein there is provided a thermo element that contains a thermo-sensitive element, there being a plate arranged contiguous to a portion of the patient's body for transmitting the heat accurately from the patient to the thermo-sensitive element, the remaining portion of the thermo element being completely insulated to insure that the device is not affected by the ambient temperature, the box or housing for the thermo-sensitive element adapted to be made of a double wall or thickness of non thermal conducting material, such as glass, or wherein the walls of the box may have a vacuum therebetween, or there may be non thermal, such as natural silk interposed between the walls, the thermal plate being free to be engaged by a portion of a person's body.

A further object of the invention is to provide a clinical thermograph which can be readily attached to or detached from a person's body, there being a clinical temperature chart which can be readily detached from the instrument without harming the paper diagram, there being a bracket which can be supplied as a spare part, the bracket adapted to be used for supporting the chart, and wherein the bracket can be made of any suitable material, such as metal or plastic.

Another object of the invention is to provide a clinical thermograph which is extremely simple and inexpensive to manufacture.

Other objects and advantages will be apparent during the course of the following description.

In the accompanying drawing forming a part of this application, and in which like numerals are used to designate like parts throughout the same:

Figure 1 is a side elevational view of the clinical thermograph of the present invention, with the cover removed and with the temperature recording chart removed from the instrument;

Figure 2 is a top plan view of the instrument with the cover removed;

Figure 3 is a bottom plan view of the instrument of the present invention, with part broken away and shown in sections;

Figure 8 is a view showing the clinical temperature chart detached from the instrument;

Figure 4:
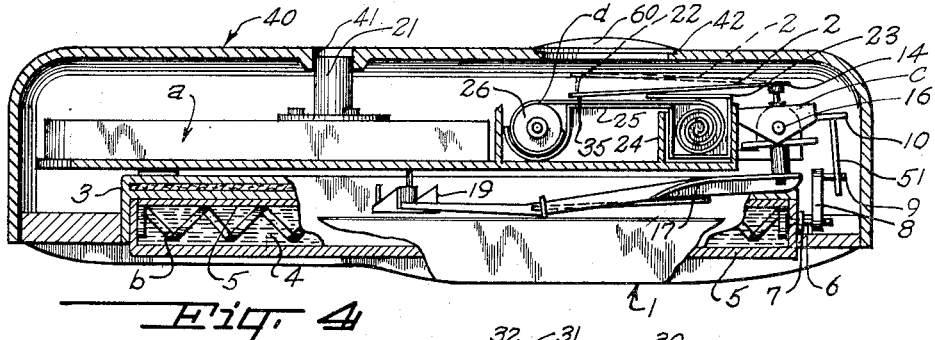
Figure 4 is a side elevational view of the instrument, with parts broken away and in section.
Figure 5:
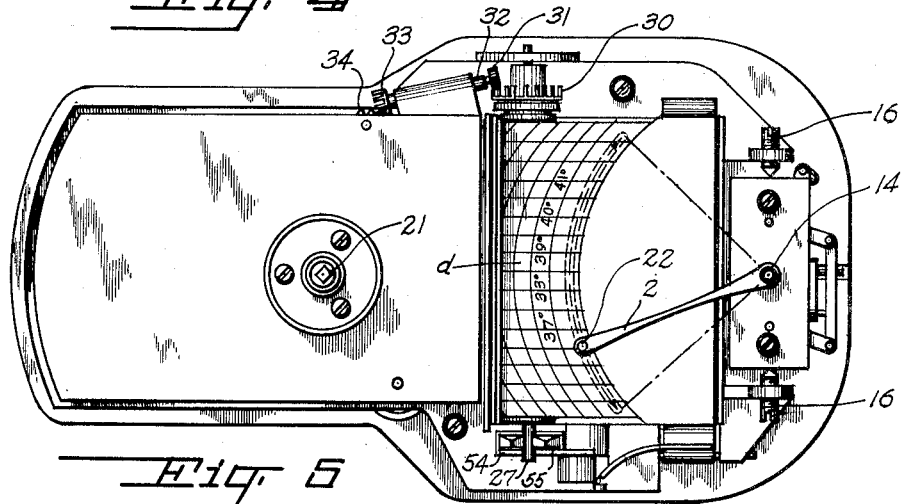
Figure 5 is a top plan view of the instrument with the cover removed and showing the thermogram in place.

Referring in detail to the drawings, there is shown a clinical thermograph which may be attached to a portion of a patient's body, such as the wrist of the patient. Broadly, the clinical thermograph of the present invention includes a clockwork mechanism $a$ which may be conventional, a thermal plate 1 which is arranged contiguous to a thermo-sensitive element $b$. The instrument further includes a marking device $c$ which is coupled to the thermo-sensitive element $b$. A temperature recording means $d$ is provided, and the means $d$ includes a clinical temperature chart which circulates or moves due to the movement of the clockwork mechanism $a$ so that a displacement needle 2 can indicate and record the temperature fluctuations of the patient's body.

The thermo-sensitive element $b$ may be constructed of bi-metallic metal, and acts as a propeller, since it is capable of winding or unwinding itself as a result of heat received from the thermal plate. The element $b$ is preferably submerged in an oil bath 4 which is contained within a metal housing or cell 5, whereby heat is received by the element $b$ through direct transmission. The cell 5 is covered with an insulating material, preferably double-walled, and the walls in-between are filled in with either vacuum or thermo-insulating material.

The free end of the sensitive element terminates in a shaft portion 6 which extends through a bearing 7 that is arranged on the outside of the housing or cell 5. Extending upwardly from the portion 6 is an arm 8 which carries the crank pin 9, Figure 4. The crank pin 9 is mounted for movement into engagement with leg 51, and the leg 51 depends from a lever 10. Pivotally connected to the lever 10 by pins 52 is a pair of spaced parallel links 11. Secured to the other end of the links 11 are sector wheels 12 which are provided with a plurality of teeth thereon. The pair of links 11 form a part of a variable parallelogram, and the position of the links 11 is determined by the temperature imparted to the thermo-sensitive element b. The sector gears 12 are arranged in engagement with a pinion 13, the pinion 13 being mounted on an axle 14 which extends throughout the marking device c. The axle or shaft 14 has a needle 2 mounted on its upper end, and the needle 2 is mounted for pivotal movement about an axis extending through the axle 14, whereby the needle 2 will be pivoted and will indicate on the clinical temperature chart the variations of temperature in the body of the patient.

Axles 15 provide a pivotal connection for the gears 12, and the axles 14 and 15 are mounted on the marking device c.

A pair of screw members 16 provide a pivotal connection for the marking device c, Figure 2. The screw members 16 extend into engagement with opposite ends of the marking device c, whereby the marking device can pivot or rock about a pivot extending about the screw member 16.

For operatively connecting the marking device c to the clock mechanism a, an arm 17 has one end connected to the bottom of the marking device c by a suitable securing element, such as a screw 53, Figure 3. A spring 18 is arranged in engagement with a portion of the arm 17 for normally urging the arm 17 into engagement with a cam 19. The cam 19 is mounted on an axle 20 which is rotated by the usual clockwork mechanism a. For winding the clockwork mechanism a, there is provided a conventional prismatic axle 21 which is adapted to be engaged by a special key. Thus, as the cam 19 is rotated by the clockwise mechanism, the arm 17 will be moved up and down whereby the marking device c will be tilted, and this will cause the needle 2 to be moved up and down, whereby the clinical temperature chart will be selectively pierced, as later described in this application. Thus, as shown in Figure 4, the needle 2 will move back and forth between the solid and dotted line positions shown in Figure 4 during the use of the instrument of the present invention.

Arranged in the free end of the needle 2 is a perforating point 22 which extends in the direction of the thermogram d. The clinical temperature chart may be made of paper or any other easily perforated material. Thus, the needle 2 not only provides a visual indication of its position during its lateral displacement, but it also perforates and marks the clinical thermograph chart so that a permanent record of the patient's temperature is provided.

The temperature recording means d includes a bracket 23, Figure 4, which is detachably mounted in the instrument, and the bracket 23 is arranged contiguous to a partition 24. The partition 24 has its upper portion shaped to provide a platform 25 over which passes the chart of the thermogram. The thermogram further includes a take-up drum or roller 26 which has an axle or trunnion 27 extending from one end thereof.

The take-up roller 26 is detachably arranged in the bracket 23. Thus, there is provided a pair of jaws 54 and 55 which are pivotally mounted on a pin 56, the jaws being mounted for movement into and out of closing relations with respect to the trunnion or axle 27. A bracket 58 is adapted to be engaged by a manually operable lever 59, the bracket 58 being pivotally mounted by means of a pin 60'. A portion of the bracket 58 is arranged in engagement with a lug 57 that extends from the jaw 54, there being a pivot pin 56 for supporting the jaws 54 and 55. Thus, as shown in Figure 1, the lever 59 can be depressed manually, so that the jaws 54 and 55 will close about the trunnion 27. By raising the lever 59, the jaws 54 and 55 will open, whereby the roller 26 can be removed. Arranged opposite to the jaws 54 and 55 is a ratchet shaft 29 upon which is mounted a toothed wheel 30. The shaft 29 may have a square inner portion for engagement with a suitable socket in the roller 26.

A means is provided for operatively connecting the shaft 29 to the clock mechanism a. This means comprises a toothed wheel 30 that is mounted on the shaft 29, and arranged in meshing engagement with the wheel 30 is a pinion 31, the pinion 31 being mounted on an axle or shaft 32. Arranged on the other shaft 32 is a pinion gear 33 which is arranged in engagement with a gear 34 that is rotated by the clockwork mechanism a. Thus, the roller 26 can be coupled to the clockwise mechanism a and the clinical temperature chart will be actuated upon movement of the clockwise mechanism. Therefore, the chart of the thermogram will be displaced in accordance with the hourly velocity marked on the clinical chart.

There is provided in the platform 25 an arcuate groove 35 which is arranged below the perforating pin 22 of the needle 2, so that when the cam 19 acts on the arm 17, the movement of the marking device c will cause the needle 2 to jump, whereby the point 22 will strike the paper chart of the thermogram d and perforate the chart and thereby leave a mark which indicates the corresponding point of the thermic curve.

Arranged in engagement with the bracket 23 is a spring 36 and a partition 37 abuts the bracket 23. The pawl 38 is arranged adjacent the partition 37 for engagement with the bracket 23. After the chart has been used, the take-up roller 26 and the bracket 23 can be readily removed by manually pressing the lever 59 which opens the jaws 54 and 55, and the pawl 38 displaces the bracket 23. While the chart is being removed, the needle 2 is displaced manually or moved to the position shown in Figure 2. When manual pressure is released on the needle 2, there is provided a spring 44, Figure 3, which serves to return the needle 2 to its normal position.

Figure 6:
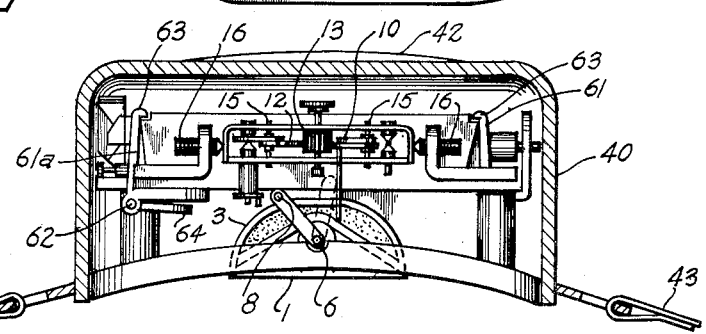
Figure 6 is a transverse sectional view taken through the instrument.

The marking device c and watch mechanism a are mounted on a base e made of non-thermal material, Figure 6, and for protecting the parts there is provided a cover 40 which must be made, preferably, of a non-thermal material, in order to insulate the apparatus from the ambient temperature. The cover 40 is provided with an opening 41, whereby the key can be inserted and arranged in engagement with the shaft 21 for winding the clockwork mechanism a. The cover 40 is also provided with an aperture 42, Figure 4, and a glass plate 60 is seated in the opening 42 to define a window. The window 60 is arranged above the chart of the thermogram, so that by looking through the window 60, the needle 2 can be observed, whereby the temperature reading can be observed.

For attaching the instrument of the present invention to a part of the patient's body, such as the wrist, there is provided a pair of straps 43, Figure 6. By attaching the instrument to the person's wrist, the plate 1 will be arranged contiguous to the body and a graphic register will result due to the perforations in the chart made by the point 22 of the needle 2.

From the foregoing, it is apparent that a clinical thermograph has been provided which is adapted to be applied directly to a portion of a patient's body, so that the temperature of the body can be indicated and recorded on the thermogram. The instrument of the present invention includes the clockwork mechanism a, the thermal plate 1 which is arranged contiguous to the thermo-sensitive element b, the marking device c which is coupled to the element b, and the temperature recording means d. The temperature recording means d is provided with a clinical temperature chart which circulates due to the movement of the clockwork mechanism a, so that the various positions of the needle 2 will be indicated and marked on the chart. The cam 19 causes the arm 17 to be alternately raised and lowered as the clockwork mechanism functions, and this in turn causes the marking device c to rock back and forth. As the marking device c pivots about an axis extending through the screw members 16, the needle 2 will be raised and lowered, as shown in solid and broken lines in Figure 4, whereby the piercing point 22 will cause perforations to be formed in the chart of the thermogram. At the same time, the bimetallic spiral *b* will impart a rotary or swinging movement to the needle 2 due to the parts 8, 9, 51, 10 and 11. The wheels 12 are arranged in meshing engagement with the pinion 13, so that the needle 2 will be displaced laterally or move angularly and indicate on the clinical temperature chart the variations of temperature in the patient's body. The clockwork mechanism is adapted to be wound by a suitable key which can be extended through the opening 41 and into engagement with the shaft 21. The needle 2 permits the temperature to be read visually through the window 60, and the piercing point 22 on the needle 2 assures that there will be provided a permanent record of the patient's temperature. Also, the take-up roller 26 is continually rotated by means of the clockwork mechanism *a*, so that the chart will be marked in accordance with the hourly velocity marked on the chart. Furthermore, the chart can be readily removed when it is to be replaced. The straps 43 permit the instrument to be readily attached to and detached from the patient's body, as for example, the wrist of the patient.

Also, the instrument functions smoothly and accurately. The marking device *c* permits the needle 2 to move angularly in order to indicate the temperature in accordance with the heat received by the thermo-sensitive element *b*. The point 22 perforates the chart as a result of the cam 19 that is actuated by the clock *a*. Thus, the needle 2 responds to the temperature of the element *b* and at the same time responds to the power or movement transmitted by the arm 17. The needle 2 provides resistance against pivotal movement due to the action of the spring 44. It is to be understood that certain modifications can be employed in the instrument. For example, other means can be used for rotating the drum 26, and also the mechanism for retaining the drum 26 in place can be varied. The marking device *c* thus performs a double function, since it derives one movement from the thermo-sensitive element *b*, and also provides a pivotal support for the needle 2 which is actuated by the cam 19.

For retaining the bracket 23 in place, L-shaped clips 61 and 61*a* may be provided on opposite sides of the bracket 23. The clip 61*a* is pivotally supported on a pin 62, Figure 6, and a lower finger engaging portion 64 is provided for causing the lip 63 of the clip 61*a* to be swung out of the way by pressing with one's finger the lever 59, that leads, through portion 39, to clip 61*a*, this clip moving pivotally on the pin 62.

Figure 7:
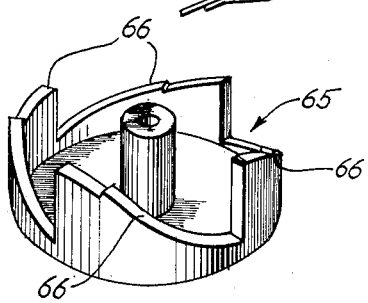
Figure 7 is a perspective view of a modified cam.

It is to be noted that the bi-metallic element *b* normally has a certain amount of rigidity so that during the marking of the temperature, the needle will bruskly jump from one point to another. This interrupted and brusque movement of the needle is the natural consequence of the function of the bimetallic element *b* due to the different constructions of the two metals being acted upon. According to the present invention, this inertia of the bi-metallic element *b* due to the different constructions of the two metals being acted upon. According to the present invention, this inertia of the bimetallic element is overcome by initially moving the spiral portion of the bi-metallic member. The mechanism for overcoming this inertia includes a modified cam 65, Figure 7, the cam 65 being provided with a plurality of stepped teeth 66 which engage an end of the arm 17, and this gives little sharp strokes to the marking device *c*, which leads to the thermo-element through the members 51, 9, 8 and 6. This construction insures that the thermo-element receives a slight push before the needle marks the temperature, and this slight push is sufficient to insure that the temperature will be recorded with extreme accuracy.

In order to insure that the apparatus functions properly and accurately, the thermo-element, except the plate, is perfectly insulated thermally from the ambient atmosphere or temperature. If this is not done, then the apparatus will not work satisfactorily. Therefore, the thermo-element may be covered by a double wall non-thermal box and the walls of the box may be made of glass with a vacuum therebetween such as in a Thermos-type bottle. Or, the walls may be filled with a non-thermal material such as natural silk, and with the thermal plate left free to be engaged by a person's body. Also, the instrument of the present invention includes a means for readily attaching and detaching the instrument from a portion of the patient's body and the clinical temperature chart can be detachably connected without harming the paper diagram due to the provision of the bracket. The bracket may be made of any suitable material such as metal or plastics and may be supplied as a spare part.

Figure 9:
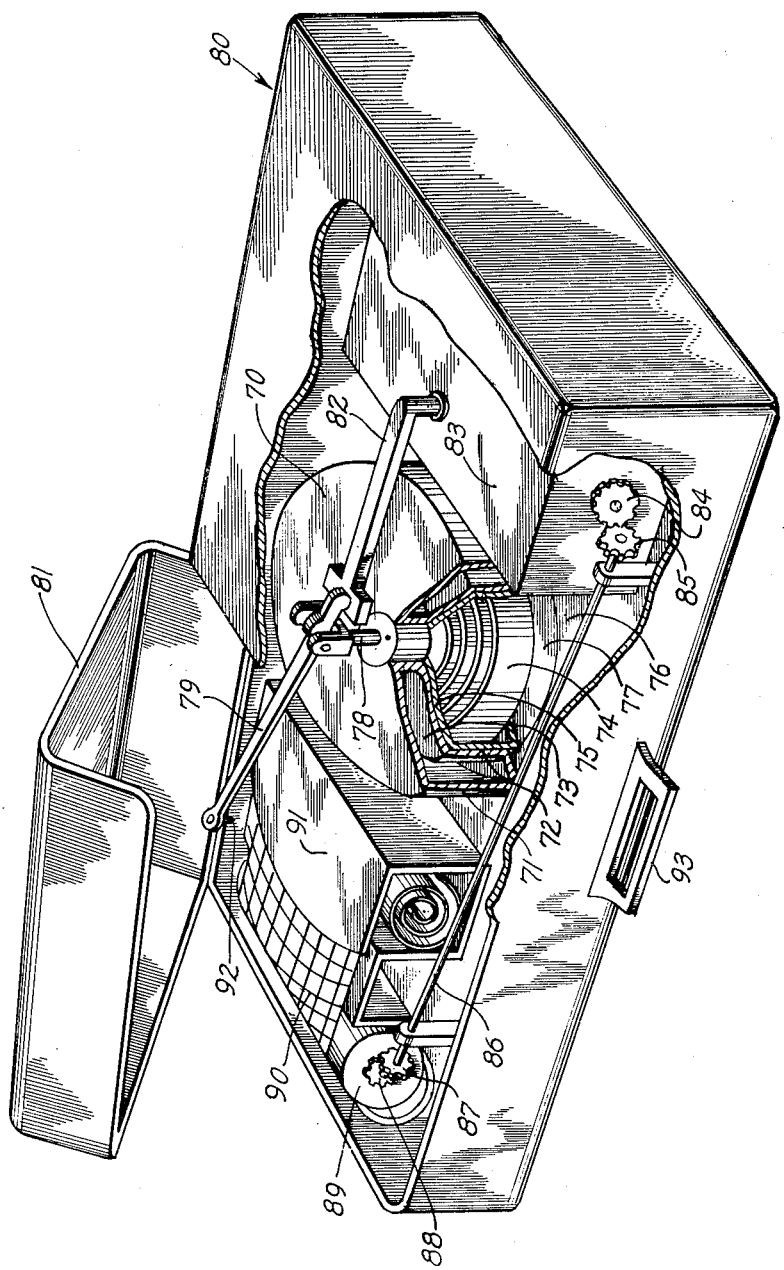
Figure 9 is a perspective view of a modified clinical thermograph, with parts broken away and in section.

Referring to Fig. 9 of the drawing, there is shown a modified clinical thermograph which includes a housing indicated by the numeral 80, and hingedly connected to the housing 80 is a cover 81. Thus, the cover 81 can be raised to the position shown in Fig. 9 when access is to be gained into the interior of the housing. Positioned in the housing 80 is a box 70 which may be made of any suitable material, such as glass, the box 70 including spaced-apart walls with a vacuum therebetween, the walls of the box 70 being indicated by the numeral 71. Arranged within the box 70 is a casing 72 which is made of a good heat-conducting material, such as metal, and positioned in the casing 72 is a spiral bi-metallic member indicated by the numeral 74. The vacuum or space between the walls of the box 70 is indicated by the numeral 73. The top wall of the casing 72 is indicated by the numeral 75.

The modified clinical thermograph of Fig. 9 further includes a plate 76 which is made of a material that will not conduct heat, and the plate 76 is provided with a cut-out or opening 77 for the projection therethrough of the casing 72. Operatively connected to the bi-metallic element 74 is an axle 78. An arm 79 is pivotally mounted on the upper end of the axle 78. One end of the arm 79 has a bar 82 connected thereto and the other end of the bar 82 is connected to a clockwork mechanism 83. A gear 84 is rotated by the clockwork mechanism 83 and the gear 84 is arranged in meshing engagement with a gear 85 which is mounted on one end of a shaft 86.

Arranged on the other end of the shaft 86 is a gear 87 which meshes with a gear 88 that is connected to a drum or roller 89. A chart 90 is adapted to be wound onto the drum 89, and the chart 90 is positioned in a bracket 91 which may be detachably mounted in the housing 80.

The free end of the arm 79 carries a point 92 that is adapted to selectively pierce the chart 90 in the same manner as described with the form of invention shown in Figs. 1–8. Suitable brackets or clasps 93 are arranged on the housing 80 and the brackets 93 are adapted to be connected to a suitable strap whereby the thermograph of the present invention can be readily attached to a portion of a patient's body.

From the foregoing, it is apparent that a thermograph has been provided which includes a vacuum type box 71 which surrounds the thermo-sensitive element 74. A base 76 preferably constituted of heat-insulating material is provided with a cut-out 77 whereby the casing 72 which is made of heat-conducting metal can extend into contact with the patient's body. The temperature of the patient's body will thus act upon the bimetallic element 74 to rotate the axle 78 and cause movement of the piercing body 92 whereby the chart 90 will be selectively pierced. Also, the clockwork mechanism 83 operates through the gears to cause movement of the roller 89 which causes similar movement of the chart 90. Thus, the thermo-sensitive element in the present invention is completely insulated from the ambient temperature and from the temperature within the housing 80. The clockwork mechanism 83 serves the dual purpose of causing the chart 90 to move and to cause the point 92 to pierce the chart 90. The chart 90 is preferably provided with grade and hour divisions and the chart can be detached from the housing when desired.

I claim:
1. A clinical thermograph comprising a housing, a heat-insulating box positioned in said housing, a casing of heat-conducting material positioned within said box and including a bottom plate, a bi-metallic element positioned in said casing, a base having an opening for the projection therethrough of said plate portion of said casing, an axle connected to said bi-metallic element and projecting through said box and casing, an arm provided with a piercing point pivotally connected to said axle, a bar connected to said arm, temperature recording means mounted in said housing and including a chart, a clockwork mechanism mounted in said housing and connected to said bar to reciprocate said bar to pivot said arm and cause said piercing point to penetrate said chart, straps for detachably connecting said clinical thermograph to a patient's body, a first gear rotated by said clockwork mechanism, a second gear arranged in meshing engagement with said first gear, a shaft connected to said second gear, said temperature recording means including a drum, and gear means connecting said shaft to an end of said drum.

2. A clinical thermograph as recited in claim 1 in which said chart is mounted upon a drum, a bracket having a drum receiving recess therein, said drum being freely mounted in said drum receiving recess.

3. A clinical thermograph as recited in claim 2 in which said bracket is formed with a platform for supporting said chart adjacent said drum receiving recess, said chart supporting platform being formed with an arcuate slot therein for receiving said piercing point.

4. A clinical thermograph comprising a housing, a heat-insulating box having a lower open end and positioned in said housing, a casing of heat-conducting material positioned within said box and including a bottom plate, a spiral bi-metallic element positioned within said casing, a base having an opening therein, said plate projecting through said opening and the lower open end of said box, an axle connected to said bi-metallic element and projecting through said box and casing, an arm provided with a piercing point pivotally connected to the projecting end of said axle, a bar connected to said arm, a chart mounted in said housing, a clockwork mechanism mounted in said housing and connected to said bar to reciprocate said bar to pivot said arm and cause said piercing point to penetrate said chart, straps for detachably connecting said clinical thermograph to a patient's body, a first gear rotated by said clockwork mechanism, a second gear arranged in meshing engagement with said first gear, a shaft connected to said second gear, a drum for carrying said chart and gear means connecting said shaft to said drum.

5. A clinical thermograph as recited in claim 4 in which said gear means connecting said shaft to said drum comprises a third gear mounted on said drum, said third gear meshing with a fourth gear mounted on said shaft.

References Cited in the file of this patent

UNITED STATES PATENTS

| | | |
|---|---|---|
| 373,719 | Brewster | Nov. 22, 1887 |
| 1,459,087 | Cox | June 19, 1923 |
| 1,478,084 | Whittington | Dec. 18, 1923 |
| 2,520,872 | Zuehlke | Aug. 29, 1950 |
| 2,609,690 | Osborne | Sept. 9, 1952 |
| 2,676,087 | Wales | Apr. 20, 1954 |

FOREIGN PATENTS

| | | |
|---|---|---|
| 352,313 | Germany | Apr. 24, 1922 |
| 847,451 | France | July 3, 1939 |